United States Patent [19]

Seifert

[11] Patent Number: 5,609,762
[45] Date of Patent: Mar. 11, 1997

[54] CELLULOSE MEMBRANES COMPRISING COTTON FIBERS AND METHOD OF MANUFACTURING THEM

[75] Inventor: Jurgen Seifert, Grosswallstadt, Germany

[73] Assignee: AKZO Nobel NV, Arnhem, Netherlands

[21] Appl. No.: 321,302

[22] Filed: Oct. 11, 1994

[30] Foreign Application Priority Data

Oct. 8, 1993 [DE] Germany ............... 43 34 277.9

[51] Int. Cl.$^6$ .................................................. B01D 71/10
[52] U.S. Cl. ................ 210/500.24; 162/65; 210/500.29
[58] Field of Search ................ 210/500.29, 500.24; 264/41, 49; 162/65, 95

[56] References Cited

U.S. PATENT DOCUMENTS

| | | |
|---|---|---|
| 2,219,490 | 10/1940 | Pisarev . |
| 3,652,386 | 3/1972 | Noreus et al. . |
| 3,759,783 | 9/1973 | Samuelson et al. . |
| 4,087,316 | 5/1978 | Jividen et al. ............ 162/14 |
| 4,668,396 | 5/1987 | Baurmeister et al. . |
| 4,814,440 | 3/1989 | Behnke et al. . |
| 4,882,106 | 11/1989 | Johnson et al. ............ 264/41 |
| 5,068,269 | 11/1991 | Diamantoglou . |
| 5,171,444 | 12/1992 | Diamantoglou et al. . |
| 5,322,647 | 6/1994 | Reiche et al. . |

FOREIGN PATENT DOCUMENTS

| | | |
|---|---|---|
| 1300322 | 5/1992 | Canada . |
| 416377 | 3/1991 | European Pat. Off. . |
| 698164 | 10/1940 | Germany . |
| 1954267 | 6/1970 | Germany . |
| 2141757 | 3/1972 | Germany . |
| 143037 | 7/1980 | Germany . |
| 3241446 | 5/1983 | Germany . |
| 3524596 | 1/1987 | Germany . |
| 3906737 | 9/1990 | Germany . |
| 4017745 | 12/1991 | Germany . |
| 4035813 | 5/1992 | Germany . |
| 4201430 | 7/1993 | Germany . |
| 89/05882 | 6/1989 | WIPO . |

OTHER PUBLICATIONS

Heermann, Dr. P., "Enzyklopadie der textilchemischen Technologie", Verlag von Julius Springer, Berlin, 1930, pp. 68–115.

Bassing, D., "Die Extraktion", *Textilveredlung* 22, No. 6, 1987, pp. 226–230 (and abstract).

Dannacher, J., et al., "'Was ist Aktivsauerstoff'?", *Textilveredlung*, 25, No. 6, 1990, pp. 205–207 (and abstract).

Chenoweth, Dennis E., et al., "Anaphylatoxin Formation During Hemodialysis: Effects of Different Dialyzer Membranes", *Kidney International*, vol. 24, 1983, pp. 764–769.

Chenoweth, Dennis E., "Biocompatibility of Hemodialysis Membranes", *Asaio Journal*, vol. 7, 1984, pp. 44–49.

Fischer–Bobsien, C.–H., *Internationales Lexikon Textilveredlung and Grenzgebiete*, 1966, p. 218.

*Primary Examiner*—Frank Spear
*Attorney, Agent, or Firm*—Oliff & Berridge

[57] ABSTRACT

In a method for manufacturing cellulose membranes in the form of flat films, tubular films, or hollow filaments with improved biocompatibility, cotton fibers, in particular linters, are treated in alkaline liquor in a single-stage process with gaseous molecular oxygen. In addition, the invention relates to cotton fibers prepared in this manner, especially linters, membranes made therefrom, and their use for hemodialysis.

46 Claims, No Drawings

CELLULOSE MEMBRANES COMPRISING COTTON FIBERS AND METHOD OF MANUFACTURING THEM

FIELD OF THE INVENTION

The invention relates to a method for manufacturing cellulose membranes in the form of flat films, tubular films, or hollow filaments with improved biocompatibility by using prepared cotton fibers, in particular, linters. The invention also relates to cotton fibers prepared in this way, particularly linters, membranes manufactured therefrom, and their application for hemodialysis.

BACKGROUND

Cellulose membranes are well known in the art and are used, e.g., in dialysis, reverse osmosis, and ultrafiltration. One important application for membranes of this type is dialyzers, particularly for hemodialysis.

Extremely demanding biocompatibility requirements are placed on dialysis membranes for hemodialysis so that the blood flowing past the membranes is affected as little as possible and the side effects for the dialysis patient are minimized. The membrane material used is crucial with respect to biocompatibility among other factors.

To prepare dialysis membranes, the cellulose is either regenerated by saponification of cellulose acetate or by precipitation with acids, lyes, saline solutions, or water from cuoxam (i.e., copper-ammonium complex, Schweitzer's reagent) solutions or viscose solutions or precipitated from solutions in aprotic solvents with salts and from solutions in tertiary amine oxide.

The starting materials for making cellulose membranes are cotton fibers, in particular, cotton linters. In addition to cellulose, cotton as a natural product, contains a number of additional substances such as pectins, waxes, proteins, mineral components and other, especially organic, components as natural products. Depending on their freedom from contamination, seed hull residues are also present.

Cotton for textile applications consists of relatively long fibers, and the first step in its production is to separate the cotton fibers from the cotton seeds (i.e., ginning). After ginning, short hairs still remain on the hulls of the mature cotton seed capsules, which short hairs are called cotton linters or linters. The cotton linters are separated mechanically from the bolls in further process steps and, by comparison to textile raw cotton, usually contain a higher proportion of contaminants such as seed hull residues.

Linters have the following approximate composition:

| | |
|---|---|
| Linters-cellulose: | approx. 75 to 90 wt. % |
| Water: | approx. 6 to 8 wt. % |
| Oils, fats, waxes: | approx. 1 to 3 wt. % |
| Seed hull residues: | approx. 1 to 5 wt. % |
| Other contaminants: | approx. 1 to 5 wt. % |

The variations depend, in particular, on the original quality and the way in which the linters were obtained. By contrast with other natural fibers, e.g., jute, flax, sisal and wood, linters contain practically no lignin. Only the seed hulls themselves contain xyloses and lignin. Depending on the type and origin of the cotton plants, linters-cellulose has an average degree of polymerization (DP) of 3,000 to 8,000.

Before further processing into membranes, the cotton and, to a greater degree, the cotton linters, must undergo treatment to clean and digest the fibers. The treated cotton fibers or linters when dry should have a cellulose content of at least 98 wt. %. Moreover, the smallest possible content of extractable mono sugars and, in particular, oligo glucanes, is necessary with a view to good biocompatibility properties. As a rule, a treatment that suffices for these requirements is kier boiling followed by bleaching.

The purpose of kier boiling is to remove or break down the above-listed additional substances and contaminants, particularly the seed hull residues, namely the non-cellulose components. This is usually done in an alkali medium (i.e., an alkaline liquor) in which the cotton or linters are digested, hydrophilized, swollen, and become receptive to bleaches and dyes, for example. Often with kier boiling, the desired degree of polymerization of the cellulose is deliberately set at the same time in order, for example, to reduce the viscosity of the cellulose solutions made therefrom for further processing.

According to the prior art, careful attention must be paid to see that no oxygen, e.g., atmospheric oxygen, is added during kier boiling. Before the start of kier boiling, all the atmospheric oxygen must be removed from the boiling vessels. Failing to preliminarily remove oxygen in prior art processes results in oxidatively damaged fibers, such as cellulose that is damaged in an uncontrolled fashion, in addition to which the degree of polymerization and the yield of pretreated linters are undesirably reduced.

Following kier boiling, the cotton fibers or cotton linters are subjected to additional kier boiling in a neutral or slightly alkaline medium and rinsed thoroughly with water, and possibly, the last alkali residues are acidified. After kier boiling, the color of the cotton fibers or linters is slightly yellowish to gray.

To break down the dyes that remain in the cellulose and for complete removal of the contaminants that have already been largely removed or loosened by kier boiling, the cotton or linters are then subjected to bleaching. In this step, the chemical and physical properties of the cellulose should be retained.

Both kier boiling and bleaching can be single-step or multi-step processes. Since according to the prior art they are carried out with different chemicals and reagents and under different reaction conditions, as a rule, kier boiling and bleaching are two separate process steps, carried out sequentially and separately, each of which is connected with one or more washing steps.

According to previous methods, large quantities of water, energy, and chemicals per kilogram of cotton fiber or linters are sometimes necessary. For example, in the typical kier boiling and bleaching process in industrial use, a total of 130 to 170 liters of water per kilogram of cotton linters is consumed, taking approximately 20 hours. In this classical method, the total organic waste is typically approximately 200 g/kg cotton linters and the inorganic waste from the lye used in excess for neutralization is approximately 200 to 300 g/kg cotton linters (calculated as $Na_2SO_4$).

The literature also teaches intermediate steps for cotton fibers and textile cotton goods. For example, P. Heermann (Enzyklopädie der textil-chemischen Technologie, Verlag Julius Springer, Berlin 1930) describes how the addition of oxidants such as sodium peroxide, perborate, or Aktivin to the kier boiling liquor results not only in kier boiling itself but also in a certain pre-bleaching of the cotton. Also, by means of the oxidation bleaching method, purification of the cotton is achieved in addition to bleaching. Here, the purification is characterized as being different from the one linked to kier boiling; in particular, reduced absorptivity or hydrophilicity of the cotton goods so treated is observed. Recently, a peroxide bleaching method has been reported (D. Bassing, Textilveredelung (22) 6, 1987, pp. 226–230) in which, in a one-step process without prior bleaching or boiling-off steps and with complexing agents being added, good absorptivity is achieved as well. These references do not state, however, whether the reported method can also be used with satisfactory results to treat cotton linters. The use of the cotton fibers treated by this method as a raw material for membrane manufacture is also not mentioned.

DE-OS 19 54 267 describes treatment of cellulose-containing materials with alkali, introducing air or gaseous oxygen, in which the process is carried out in the presence of a magnesium salt and a complexing agent. This method is used, in particular, to prepare wood cellulose containing lignin as it has particular advantages in removing the lignin. With lignin-free celluloses, the complexing agents added serve to prevent uncontrolled breakdown of the cellulose molecules. The oxygen treatment method described in the cited reference is, however, only one of several treatment stages and always relates to the manufacture of pulps, preferably lignocellulose, namely starting materials for the paper industry, and thus not to manufacture of starting materials for membranes.

The same applies to German Patent 21 41 757 in which the use of oxygen-containing gas is also described and reference is made exclusively to the bleaching of cellulose pulp previously digested by chemical means and bleaching lye and digesting lye from the previous treatment step must be simultaneously present in the liquor to achieve the desired bleaching effect and an improved delignification effect. In this case too, the oxygen bleaching step represents only one process step out of several treatment and bleaching steps for preparation of cellulose pulp.

Each of the prior art processes referred to also generate considerable quantities of wastewater, and large quantities of water, energy, and chemicals are needed to run the process.

For manufacturing cellulose membranes, cotton fibers or cotton linters are brought into the dissolved form after the kier boiling/bleaching treatment, namely after two different, independent process steps, usually followed by drying. The solutions are formed into hollow filaments, tubes, or films, with the cellulose being either regenerated or precipitated.

When kier-boiled, bleached linters of the prior art are used, the dialysis membranes made from regenerated cellulose exhibit distinct complement activation in hemodialysis. To improve biocompatibility by, for instance, reducing complement activation while retaining other favorable properties of the cellulose membranes, there are various methods such as cellulose modified by substitution, admixture of cellulose modified by substitution or admixture of other suitable polymers. Such methods are described in documents DE-OS 35 24 596, EP 0 416 377, and DE-OS 40 17 745. However, such methods always increase expenditures by adding necessary process steps.

SUMMARY OF THE INVENTION

Accordingly, a goal of the instant invention is to make available cellulose membranes with improved biocompatibility using cotton fibers, particularly cotton linters, prepared by an improved, simple, environmentally benign, and economical process.

This and other goals are achieved by a method for manufacturing membranes in the form of hollow filaments, tubular films, or flat films by preparation of cotton fibers, in particular cotton linters, dissolving the prepared cotton fibers or linters by chemical or physical methods, and forming the solutions so obtained into membranes, wherein the cotton fibers or linters are treated in an alkaline liquor in a one-step process with gaseous molecular oxygen, the cotton fibers or cotton linters are separated from the alkaline bath, washed, and possibly dried, then dissolved by a chemical or physical method, and the solution is then processed into membranes with regeneration or precipitation of the cellulose.

DESCRIPTION OF PREFERRED EMBODIMENTS

The method most frequently used for regeneration of cellulose in the manufacture of membranes is the cuoxam (copper-ammonium complex, Schweitzer's reagent) method. Accordingly, a preferred embodiment of the invention is characterized by the cotton fibers or cotton linters being dissolved by the cuoxam method.

In the same way, processing of the cotton fibers or cotton linters prepared according to the invention can be carried out by the cellulose xanthogenate method (viscose method). The xanthogenate method is described, for example, in Patent DD-PS 143 037.

Another preferred embodiment relates to the use of cellulose solvents consisting of a mixture of aprotic solvents and a salt of the elements Li, Ca, and/or Mg. Aprotic solvents are, for example, dimethylacetamide and/or dimethylsulfoxide, and LiCl or CaCl can be used as salts.

Preferably, the prepared cotton fibers or linters are also dissolved in a tertiary amine oxide as a cellulose solvent, whereby a diluent that does not dissolve cellulose, water for example, is added to this solution.

One important application of the membranes made according to the method of the invention is hemodialysis. In this application, biocompatibility of the membranes is of particular interest.

In hemodialysis using membranes made of regenerated cellulose, significant complement activation has been ascertained. The complement system in the blood serum is a complex plasma enzyme system consisting of many components which system acts in various ways to defend against damage by penetrating foreign cells (bacteria and the like). When antibodies against the penetrating organism are present, the antibodies can be activated in a complement-specific manner by the antigen structures of the foreign cells. Otherwise, complement activation occurs by an alternative pathway through special surface features of the foreign cells. The complement system is based on a plurality of plasma proteins. After activation, these proteins react with one another specifically in a certain sequence, eventually forming a cell-damaging complex which breaks down the foreign cell.

Peptides are released from individual components, triggering inflammatory phenomena and sometimes having undesired pathological consequences for the organism. It is assumed that in the case of hemodialysis membranes made of regenerated cellulose, activation takes place by the alternative pathway. These types of complement activation are ascertained objectively by determining the complement fragments C3a and C5a.

Reference is made to the following papers in this connection: D. E. Chenoweth et al., Kidney International, Vol. 24, pp. 764 ff, 1983, and D. E. Chenoweth, Asaio-Journal, Vol. 7, pp. 44 ff, 1984.

In the framework of the present invention, complement activation is measured based on the C5a fragment. For this purpose, 240 ml of heparinized blood is recirculated in vitro, taking 3 hours, with a blood flow of 250 ml/min through a dialyzer with an approximately 1 $m^2$ effective exchange surface. The C5a fragments in the plasma are determined with the aid of the ELISA method (Enzyme Linked Immunosorbent Assay, made by Boehringer, Germany). The C5a concentration is given in ng/ml and the measured value after 3 hours was used for evaluation.

Surprisingly, with the membranes according to the invention, by comparison with membranes made from cotton fibers or linters kier boiled and bleached according to the prior art without further treatment of the cellulose, a significant reduction in complement activation was found. In one advantageous embodiment of the membrane according to the invention, the complement activation measured as C5a is less than 500 ng/ml, preferably less than 400 ng/ml, and in a particularly advantageous embodiment, less than 300 ng/ml. Relative to prior art cellulose membranes, the complement activation may be reduced by at least 20%, preferably by at least 30%, more preferably by at least 60%. Such low C5a values are otherwise achieved for cellulose membranes only when the cellulose is modified by substitution or when cellulose modified by substitution or other suitable polymers are mixed in.

Therefore the membrane itself, made primarily of cellulose or primarily of regenerated cellulose, is also an object of the invention, said membrane being characterized by having complement activation, measured as C5a, of less than 500 ng/ml, preferably less than 400 ng/ml, and in a particularly advantageous embodiment, of less than 300 ng/ml.

A further goal of the invention consists of making available an improved, simple, environmentally benign, and economical method for preparing cotton fibers, particularly linters.

This goal is achieved by a method for preparing cotton fibers, in particular linters, with oxidants, characterized by treating the cotton fibers or linters in an alkaline liquor in a single-step process with gaseous molecular oxygen, separating the cotton fibers or linters from the alkaline liquor, and washing and possibly drying them.

After preparation, the cotton fibers or linters are practically 100 wt. % cellulose. In the concentration data provided below, which relates to the finished product, they are accordingly given, for example, in terms of kg/kg cellulose.

As described, the classical methods for treating cotton fibers or linters, namely the kier boiling and bleaching methods of the prior art, are directed at excluding atmospheric oxygen or molecular oxygen during the kier boiling treatment and, preferably, adding per compounds to the bleach. Such bleaching methods are described, for example, in German Patent 698 164 and German document OS 40 35 813.

It has emerged from more recent studies (J. Dannacher, W. Schlenker, Textilveredelung (25) 6, 1990, pp. 205–207) that in bleaching with hydrogen peroxide compounds, "ordinary," i.e., molecular oxygen, is not the active agent, but rather, the active agent is the so-called perhydroxy radical that occurs, for example, in decomposition of peroxide compounds. The other decomposition products, such as singlet oxygen, i.e., molecular oxygen in its first electronically excited state, the perhydroxyl anion, and the hydroxyl anion have no perceptible effect according to this publication. In another document (German OS 40 35 813), molecular oxygen which arises in disproportionation of peroxo compounds, i.e., molecular oxygen in the electronically excited state, thus singlet oxygen, is used for a protective bleaching process.

Hence, it was a total surprise to find a positive effect in the treatment method according to the invention for cotton fibers and linters with the presence of gaseous molecular oxygen.

In the method according to the invention, between 0.1 and 80 wt. % of other gases can be added to the molecular oxygen. $O_3$, $CO_2$, $N_2$, $SO_2$, $NO_2$, $NH_3$, and/or air, individually or in mixtures, have proven particularly suitable for this.

In another preferred embodiment of the invention, air is, therefore, added to the alkaline liquor.

Molecular oxygen in a concentration of 0.001 to 4 kg per kg cellulose is preferred, and 0.01 to 1 kg per kg cellulose is particularly preferred. However, it has proven most advantageous to use gaseous molecular oxygen in a concentration of 0.02 to 0.4 kg per kg cellulose.

In one advantageous embodiment, the process is carried out in a closed autoclave in which the filling percentages are set at 20–99%, preferably 50 to 95%, and the oxygen pressures at 20° C. are 0.5–50 bars, preferably 1–20 bars, and particularly preferably 5–10 bars.

Preferably, the gas or gas mixture containing the molecular oxygen is wholly or partially recirculated so that only a minimal quantity of new, fresh gas or gas mixture need be added.

Aqueous solutions of inorganic compounds with an alkaline effect such as hydroxides, oxides, and/or carbonates of alkaline and/or alkaline earth metals, and possibly a mixture thereof, are preferably used for the alkaline liquor.

According to a further embodiment of the invention, the alkaline liquor can be formed of aqueous ammoniac solutions or of aqueous solutions of organic substances with an alkaline effect.

Preferably, the organic substances with an alkaline effect are amines.

The advantageous quantities of the above-stated alkaline compounds used when added together are 0.01–0.2 kg/kg cellulose, preferably 0.04–0.12 kg/kg cellulose.

According to the prior art, in the kier boiling step the necessary NaOH concentrations in the liquid are typically 0.25–0.4 kg NaOH per kg of kier-boiled linters, i.e., linters that have been kier-boiled (see Table 1), i.e., approximately 3 to 4 times the quantity needed in the method according to the invention.

Advantageously, additional substances such as peroxides, perborates, bleaching activators, complexing, surfactant, and dispersing agents and/or alcohols are added to the alkaline liquor. The bleaching activators are, e.g., tetraacetylethylenediamine (TAED); the complexing agents are, e.g., ethylenediaminetetraacetic acid (EDTA), and the alcohols are, e.g., methanol, ethanol, and/or isopropyl alcohol. The surfactants are typically alkali-resistant nonionic or anionic surfactants.

In one advantageous embodiment, the process is conducted such that the alkaline liquor and the linters are introduced into the reaction vessel, preferably a pressurized autoclave, in any sequence, and the desired quantity of gas or gas mixture is added to the autoclave. It is advantageous to mix the contents of the reactor thoroughly and heat them.

Advantageously, the alkaline liquor has a temperature of 40° to 200°, preferably 100° to 180° and particularly preferably 100° to 160° C. Heating can be done, for example, with a double jacket or internal heating coils (indirect heating) or directly by feeding hot steam into the reaction chamber.

The reaction times are not very critical. Suitable reaction times are between 0.2 and 6 hours, preferably between 0.5 and 3 hours, and particularly preferably between 1 and 2 hours.

The cellulose:liquor ratios, hereinafter "liquor ratio", are between 1:3 and 1:100, preferably between 1:5 and 1:30, and particularly preferably between 1:8 and 1:15.

Preferably, a reactor with an agitator is used. In one preferred embodiment of the method, the cotton fibers or cotton linters are held in place in the reactor, while the reaction liquid circulates.

The reactors can be operated batchwise or continuously. It is possible for two or more reactors to be operated alternately and batchwise.

The comparison between the method according to the invention and the prior art set forth below in Table 1 shows that high yields per unit volume and time are possible with the method according to the invention, inputs of consumables are considerably reduced, and at the same time, the stress on the environment is minimized. In addition, the method according to the invention is associated with a considerable reduction in cost.

TABLE 1

Comparison between method according to the invention and prior art.

|  |  | Method According to the Invention kg/ kg Product | Prior Art kg/kg Product |
| --- | --- | --- | --- |
| | Typical Raw Materials and Additive Requirement | | |
| Step 1 | Raw linters | 1.18 | 1.30 |
|  | NaOH | 0.08 | 0.25 |
|  | Water (incl. washing water) | approx. 30 | approx. 100 |
| Step 2 | Kier-boiled linters | — | 1.05 |
|  | Bisulfite lye | — | 0.015 |
|  | Chlorine gas | — | 0.10 |
|  | Sulfuric acid | — | 0.012 |
|  | Water | — | 50 |
|  | Total Batch time, h | 4 | 19 |
|  | Total energy requirement (MJ/kg bleached linters) | 15 | 33 |
|  | Linters yield % | 85 | 73* |
|  | Organic by-product (as COD in g/kg product) | approx. 105 | approx. 200 |
|  | Inorganic by-product (as $Na_2SO_4$ in g/kg product) | <1 | approx. 270 |

(COD = chemical oxygen demand)
(* = after kier boiling and bleaching)

In the kier boiling method of the prior art, a strongly alkaline, nearly black, and malodorous lye ("black liquor") occurs as a byproduct that can hardly be dealt with today in municipal treatment facilities. Additionally, high salt loadings of the waste water result from the necessary neutralization of the byproduct.

On the other hand, the method according to the invention can be operated so that a nearly neutral spent liquor is produced (Example 1) which, moreover, is clear, light yellow in color, and nearly odorless. It also contains far less organic contaminants. Because of its favorable pH, it practically does not need to be neutralized so that almost no inorganic salts are added to the wastewater load.

EXAMPLE 1

A commercial 1 liter pressurized autoclave with double-jacket heating and agitator (Büchi reactor) received the following quantities (absolute quantity of raw linters: approx. 25 g).

| kg Materials/kg Prepared Linters | |
| --- | --- |
| Raw linters | 1.18 |
| NaOH | 0.076 |
| Water | 19 |
| Molecular oxygen | 0.25 |

The reactor was filled up to about 50% of its rated volume and held at a temperature of 160° C. for a reaction time of two hours with agitation. The oxygen pressure (at 20° C.) was 10 bars and the total pressure at the reaction temperature (160° C.), approx. 20 bars.

At the end of the reaction, the reactor was cooled down and the pressure reduced by blowing-off oxygen, only a small amount of which was consumed during the reaction. The linters treated in this fashion were then filtered and washed with approximately 10 liters water per kg linters.

The linters were then subjected to various measurements, first whiteness according to Elrepho. This is a standard method for measuring the whiteness of bleached and unbleached substances. An Elrepho device made by Carl Zeiss, Oberkochen was used. The degree of reflectance of a specimen pressed into a tablet was measured against $BaSO_4$ as the white standard. An R46 filter was used. The measurement was conducted according to DIN 53,145. In addition, the average degree of polymerization (DP), the chemical oxygen demand (COD) of the wastewater, the number of carboxyl groups of the treated linters, and, for this example, the content of extractable mono sugars, and oligo glucanes were measured.

The whiteness of the linters according to Example 1 amounted to approximately 73% according to Elrepho, thus corresponding to the whiteness of linters kier-boiled and bleached by classical methods. The seed hull residues and other contaminants had been completely removed. The degree of polymerization was 1107±47, thus also corresponding to the values with classical methods. The linters yield was 85.7%. For calculation of the yield, the mass of reaction product, i.e., cellulose, and the mass of the raw linters intake, each dried at 60° C. and 20 mbars for about 10 hours, were taken.

The reaction byproduct obtained was a clear, almost colorless, odorless liquid in a quantity of approximately 20 l/kg cellulose which had a free NaOH content of less than 0.01 g/l, a practically neutral pH of 7–9, and a COD value of only approximately 5500 mg/l (corresponding to 105 g/kg cellulose).

The carboxyl group content of the prepared linters was 17.0 mmol/kg cellulose, thus corresponding to the value for conventionally kier-boiled and bleached linters which is usually 10–20 mmol/kg cellulose.

Precisely for the manufacture of membranes for which, as stated, the extracts should be as low as possible in simple mono and oligo glucanes, linters prepared by the method according to the invention appear to be particularly appropriate. For the linters prepared according to Example 1, the content of extractable mono sugars is the same as, and the content of oligo glucanes is significantly lower than, comparative specimens prepared conventionally (Tables 2 and 3).

In addition to the experimental results, Table 4 reports the DP and color value of raw linters used, as well as two comparison specimens of industrially manufactured bleached linters.

It can be seen that in the linters prepared according to the invention, the DP can be varied over a range of about 500 to 3500 with no perceptible worsening of carboxyl group number or whiteness.

TABLE 2

Extractable Quantities of Mono Sugars in Prepared Linters

| | Content (wt. %) | | | Content (mmol/kg) | | |
|---|---|---|---|---|---|---|
| Sugar | Manufacturer 2 | Example 1 (method according to invention) | Manufacturer 1 | Manufacturer 2 | Example 1 (method according to invention) | Manufacturer 1 |
| Fucose | 0.00 | 0.00 | 0.00 | 0.00 | 0.00 | 0.00 |
| Arabinose | 0.03 | 0.04 | 0.03 | 2.27 | 3.04 | 2.27 |
| Xylose | 0.08 | 0.08 | 0.09 | 6.04 | 6.07 | 6.82 |
| Mannose | 0.00 | 0.00 | 0.00 | 0.00 | 0.00 | 0.00 |
| Galactose | 0.05 | 0.00 | 0.00 | 3.10 | 0.00 | 0.00 |
| Total | 0.16 | 0.12 | 0.12 | 11.41 | 9.11 | 9.10 |

TABLE 3

Content of Oligo Glucanes of Prepared Linters (in area % FID*)

| Sugar | Bleached Bleached Linters Manufacturer 2 (Prior Art) | Linters Prepared According to Invention Example 1 | Bleached Linters Manufacturer 1 (Prior Art) |
|---|---|---|---|
| 1,3 β-Glucan | 1.11 | 0.63 | 2.84 |
| 1,2,3-Glucan | 0.03 | 0.00 | 0.00 |
| 1,3,6-Glucan | 0.60 | 0.55 | 2.83 |
| 1,2,3,6-Glucan | 0.27 | 0.42 | 0.93 |
| Total | 2.01 | 1.60 | 6.63 |

*FID = flame ionization detector

EXAMPLES 2 to 11

Examples 2 to 11 were carried out under the same conditions as Example 1, but several process parameters were varied according to Table 4.

EXAMPLES 12 to 17

For these experiments on the industrial scale, a 150 liter titanium pressurized autoclave with a vertical agitator with inclined blades and double-jacket heating was used. Liquor ratios up to 1:10 can be brought about in this reactor.

The other experimental conditions are as described in Example 1; the experimental conditions and results are reproduced in Table 5.

TABLE 4

Properties of Linters Prepared According to the Invention (Liquor Ratio 1:19)

| Ex. | Temp. (°C.) | Time (h) | $O_2$ Pressure at 20° C. (bar) | Yield (%) | DP | Liquor Composition % NaOH | pH Before/After Reaction | Elrepho Color | COOH mmol/kg | COD mg/l | COD g/kg Cellulose |
|---|---|---|---|---|---|---|---|---|---|---|---|
| 2 | 160 | 2 | 10 | 67.37 | 568 ± 18 | 1 | 13.00  8.60 | 66.7 | 22.3 | n.d.* | n.d. |
| 3 | 160 | 2 | 5 | 83.46 | 1719 ± 47 | 0.4 | 13.00  8.13 | 68.1 | 12.4 | n.d. | n.d |
| 4 | 160 | 2 | 10 | 89.47 | 1589 ± 44 | 0.04 | 11.70  5.13 | 52.7 | n.d. | n.d. | n.d. |
| 5 | 160 | 0.5 | 5 | 86.10 | 2151 ± 79 | 0.4 | 13.17  9.10 | 63.7 | n.d. | n.d. | n.d. |
| 6 | 160 | 0.5 | 10 | 86.10 | 1950 ± 94 | 0.4 | 13.21  8.88 | 66.5 | n.d. | n.d. | n.d. |
| 7 | 160 | 1 | 5 | 69.30 | 536 ± 10 | 1 | 13.94  9.45 | 70.4 | n.d. | 12388 | 235.4 |
| 8 | 160 | 1 | 5 | 84.53 | 2216 ± 106 | 0.4 | 13.00  8.68 | 68.7 | 12.3 | 6006 | 114.1 |
| 9 | 160 | 1 | 10 | 83.50 | 1734 ± 65 | 0.4 | 13.07  8.54 | 67.6 | n.d. | n.d. | n.d. |
| 10 | 140 | 2 | 5 | 85.64 | 3264 ± 112 | 0.4 | 13.00  9.65 | 71.2 | n.d. | 5931 | 102.4 |
| 11 | 140 | 2 | 10 | 86.60 | 2579 ± 112 | 0.4 | 13.14  9.16 | 66.4 | n.d. | n.d. | n.d. |
| Raw Linters | | | | | 7047 ± 1528 | | | 30.4 | 25.5 | | |
| Bleached Linters 1 | | | | | 1301 ± 18 | | | 57.4 | 10.0 | | |
| Bleached Linters 2 | | | | | 1111 ± 66 | | | 68.9 | 6.6 | | |

*n.d. = not determined

TABLE 5

Preparation of Linters on an Pilot Scale (Temperature = 160° C., Time = 2.0 h)

| Example | Raw Linters Batch kg | Yield % | O$_2$ Pressure at 20° C. bars | DP | Liquor Ratio | Liquor Composition, wt. % | Elrepho Color | COOH mmol/kg |
|---|---|---|---|---|---|---|---|---|
| 12 | 5.4 | 85.7 | 10 | 1693 ± 38 | 1:20 | 0.4 NaOH | 73.8 | 16.3 |
| 13 | 5.4 | 80.8 | 10 | 1534 ± 63 | 1:20 | 1.0 Na$_2$CO$_3$ | 70.2 | n.d. |
| 14 | 5.4 | 89.9 | 10 | 1462 ± 46 | 1:20 | 0.4 NaOH + 0.2 Na$_2$CO$_3$ | 75.0 | 14.0 |
| 15 | 7.8 | 85.2 | 10 | 1528 ± 30 | 1:15 | 0.4 NaOH + 0.2 Na$_2$CO$_3$ | 76.3 | 14.4 |
| 16 | 10.8 | 83.2 | 10 | 1408 ± 53 | 1:10 | 0.4 NaOH + 0.2 Na$_2$CO$_3$ | 69.0 | n.d. |
| 17 | 7.8 | 76.3 | 10 | 903 ± 33 | 1:15 | 0.6 NaOH 0.3 NA$_2$CO$_3$ | 76.9 | n.d. |

It can be seen that the whiteness can be considerably increased with no perceptible effect on DP or yield by suitable additives and that liquor ratios up to 1:10 are achievable without difficulty.

EXAMPLE 18

The experiment was conducted as in Example 1 but with compression to 10 bars $CO_2$ in addition to 10 bars $O_2$ (both at 20° C.). The total pressure at 160° C. was 32 bars. In this case, $Na_2CO_3$ appeared by reaction between the $CO_2$ and the NaOH already present in the liquor.

The reaction product obtained was prepared linters with a yield of 91.2 wt. % and a DP of 1595±125. All the visible contaminants (seed hulls, etc.) were removed.

EXAMPLES 19 to 21

Examples 19 to 21 were carried out analogously to Example 1 with the exception that synthetic air containing 21 vol. % $O_2$ and the remainder $N_2$ was used as the gas instead of oxygen. The results are compiled in Table 6.

TABLE 6

Preparation of Linters with Synthetic Air as Reaction Gas

Liquor Ratio 1:19
NaOH Concentration: 0.4 wt. %

| Example | Temp (°C.) | Time (h) | Pressure (bars) | Yield (%) | DP | pH Before/After Reaction | | Elrepho Color | COOH mmol/kg | COD g/kg Cell |
|---|---|---|---|---|---|---|---|---|---|---|
| 19 | 160 | 2 | 10 | 83.1 | 1814 ± 34 | 13.00 | 8.40 | 68.1 | 15.6 | 110.5 |
| 20 | 160 | 2 | 5 | 81.1 | 2213 ± 30 | 13.00 | 9.25 | 63.3 | n.d. | n.d. |
| 21 | 160 | 1 | 5 | 84.6 | 2492 ± 68 | 13.05 | 9.76 | 56.7 | n.d. | n.d. |

By comparison to the corresponding experiments with pure oxygen, the DP values were 15–20% higher with comparable yields and comparable COD values. All visible contaminants such as seed hulls, etc. were also completely removed.

EXAMPLE 22

This test was conducted as in Example 1. However, the reaction liquid contained, in addition to the 0.4 wt. % NaOH, 0.05 wt. % Leophen® and 0.05 wt. % Kieralon B® (registered trademarks of BASF).

Leophen® is a wetting and dispersing agent especially developed for alkaline boiling of cotton; Kieralon B® is a mixture of nonionic and anionic surfactants developed for the same purpose.

The reaction product was a linters with no visible contaminants and Elrepho whiteness of 74.8 and a DP of 1895±67.

The yield was 89.3% and thus even higher than that of Example 1.

Accordingly, the new method according to the invention can also be advantageously used when the additives developed for the classical kier boiling method are to be added.

EXAMPLE 23

A cotton card sliver with an Elrepho whiteness of 66.0 was held for 1 hour under reaction conditions according to the method of Example 1 at 140° C., 10 bars $O_2$ (at 20° C.) and a liquor ratio of 1:19 (with 0.04 wt. % NaOH in the reaction liquid).

The reaction product was a completely white cotton (Elrepho whiteness: 80.8) in a yield of 95 wt. % and a DP of 5021±84. The fiber length and structure were completely retained. The COD of the spent liquor with a pH of 5.97 was calculated as 51 g/kg cotton.

EXAMPLE 24

Cellulose-cuoxam solutions of linters prepared according to Example 17, as well as a commercially available bleached linters sample for comparison, were made in the usual manner each with 9 wt. % cellulose and spun into capillary membranes with a dry lumen (inside diameter after spinning and drying) of approximately 160 μm and a wall thickness of approximately 8 μm in known fashion.

The membranes made from the linters prepared according to Example 17 had complement activation, measured as C5a value, of 276 ng/ml and, hence, a C5a value reduced by approximately 60% by comparison with the membranes prepared from the commercially available kier-boiled and bleached linters according to the prior art.

What is claimed is:

1. A method for manufacturing biocompatible cellulose membranes in the form of hollow filaments, tubular films, or flat films, said method comprising:

bleaching and cleaning raw cotton fibers with gaseous molecular oxygen in an alkaline liquor by a one-step process and, without further bleaching, separating the treated cotton fibers from the alkaline liquor;

washing the separated cotton fibers;

dissolving the washed cotton fibers to form a solution;

regenerating or precipitating cellulose from the solution; and processing the cellulose into biocompatible membranes.

2. The method for manufacturing cellulose membranes according to claim 1, wherein the cotton fibers comprise cotton linters.

3. The method for manufacturing cellulose membranes according to claim 1, wherein the cotton fibers are dissolved by a cuoxam method.

4. The method for manufacturing cellulose membranes according to claim 1, wherein the cotton fibers are dissolved by a xanthogenate method.

5. The method for manufacturing cellulose membranes according to claim 1, wherein the cotton fibers are dissolved in a mixture of aprotic solvents and at least one salt selected from the group consisting of lithium salts, calcium salts and magnesium salts.

6. The method for manufacturing cellulose membranes according to claim 1, wherein the cotton fibers are dissolved in a tertiary amine oxide.

7. The method for manufacturing cellulose membranes according to claim 6, further comprising adding to the tertiary amine oxide a diluent that does not dissolve cellulose.

8. The method for manufacturing cellulose membranes according to claim 1, further comprising adding 0.1 to 80 wt. % of at least one other gas to the gaseous molecular oxygen.

9. The method for manufacturing cellulose membranes according to claim 8, wherein the other gas is at least one gas selected from the group consisting of $O_3$, $NO_2$, $CO_2$, $N_2$, $SO_2$, $NH_3$ and air.

10. The method for manufacturing cellulose membranes according to claim 1, further comprising adding air to the alkaline liquor.

11. The method for manufacturing cellulose membranes according to claim 1, further comprising recirculating the gaseous molecular oxygen.

12. The method for manufacturing cellulose membranes according to claim 1, wherein the gaseous molecular oxygen is at a concentration of 0.001 to 4 kg/kg cellulose.

13. The method for manufacturing cellulose membranes according to claim 1, wherein the gaseous molecular oxygen is at a concentration of 0.01 to 1.10 kg/kg cellulose.

14. The method for manufacturing cellulose membranes according to claim 1, wherein the gaseous molecular oxygen is at a concentration of 0.02 to 0.4 kg/kg cellulose.

15. The method for manufacturing cellulose membranes according to claim 1, wherein the method is conducted in a closed autoclave set to a filling percentage of 20–99% and an oxygen pressure of 0.5–50 bars.

16. The method for manufacturing cellulose membranes according to claim 15, wherein the filling percentage is set at 50–95%.

17. The method for manufacturing cellulose membranes according to claim 15, wherein the oxygen pressure is set at 1–20 bars.

18. The method for manufacturing cellulose membranes according to claim 17, wherein the filling percentage is set at 50–95%.

19. The method for manufacturing cellulose membranes according to claim 15, wherein the oxygen pressure is set at 5–10 bars.

20. The method for manufacturing cellulose membranes according to claim 19, wherein the filling percentage is set at 50–95%.

21. The method for manufacturing cellulose membranes according to claim 1, wherein the alkaline liquor comprises at least one inorganic compound selected from the group consisting of alkaline hydroxides, alkaline oxides, alkaline carbonates, alkaline earth metal hydroxides, alkaline earth metal oxides and alkaline earth metal carbonates.

22. The method for manufacturing cellulose membranes according to claim 1, wherein the alkaline liquor comprises aqueous ammoniac solutions or aqueous solutions of organic substances having an alkaline effect.

23. The method for manufacturing cellulose membranes according to claim 22, wherein the organic substances having an alkaline effect are amines.

24. The method for manufacturing cellulose membranes according to claim 1, wherein 0.01 to 0.2 kg of alkaline compounds per kg of cellulose is added to the alkaline liquor.

25. The method for manufacturing cellulose membranes according to claim 1, wherein 0.04 to 0.12 kg of alkaline compounds per kg of cellulose is added to the alkaline liquor.

26. The method for manufacturing cellulose membranes according to claim 1, further comprising adding to the alkaline liquor at least one member selected from the group consisting of peroxides, perborates, bleaching activators, complexing agents, surfactants, dispersing agents and alcohols.

27. The method for manufacturing cellulose membranes according to claim 1, wherein the one-step process for treating cotton fiber comprises:

adding the alkaline liquor and the cotton fibers in any order to a reactor;

adding a predetermined quantity of the gaseous molecular oxygen or a gas mixture to the reactor;

thoroughly mixing contents of the reactor; and heating contents of the reactor.

28. The method for manufacturing cellulose membranes according to claim 27, wherein the reactor is a pressurized autoclave.

29. The method for manufacturing cellulose membranes according to claim 27, wherein the reactor includes an agitator.

30. The method for manufacturing cellulose membranes according to claim 27, wherein the cotton fibers are retained in the reactor and the reaction liquid is circulated.

31. The method for manufacturing cellulose membranes according to claim 27, wherein the reactor is continuously operated.

32. The method for manufacturing cellulose membranes according to claim 27, further comprising using at least one additional reactor.

33. The method for manufacturing cellulose membranes according to claim 1, wherein the alkaline liquor has a temperature of 40° to 200° C.

34. The method for manufacturing cellulose membranes according to claim 1, wherein the alkaline liquor has a temperature of 100° to 180° C.

35. The method for manufacturing cellulose membranes according to claim 1, wherein the alkaline liquor has a temperature of 120° to 160° C.

36. The method for manufacturing cellulose membranes according to claim 1, wherein the one-step process for treating cotton fiber has a reaction time between 0.2 and 6 hours.

37. The method for manufacturing cellulose membranes according to claim 36, wherein the reaction time is between 0.5 and 3 hours.

38. The method for manufacturing cellulose membranes according to claim 36, wherein the reaction time is between 1 and 2 hours.

39. The method for manufacturing cellulose membranes according to claim 1, wherein the one-step process for treating cotton fiber has a ratio of cotton fiber:alkaline liquor between 1:3 and 1:100.

40. The method for manufacturing cellulose membranes according to claim 39, wherein the ratio is between 1:5 and 1:30.

41. The method for manufacturing cellulose membranes according to claim 39, wherein the ratio is between 1:8 and 1:15.

42. A cellulose membrane prepared according to the method of claim 1.

43. The cellulose membrane according to claim 42, having a complement activation, measured as C5a, of less than 500 ng/ml.

44. The cellulose membrane according to claim 42, having a complement activation, measured as C5a, of less than 400 ng/ml.

45. The cellulose membrane according to claim 42, having a complement activation, measured as C5a, of less than 300 ng/ml.

46. The method for manufacturing cellulose membranes according to claim 1, further comprising drying the washed cotton fibers prior to dissolving said fibers.

* * * * *